(12) United States Patent
Webster et al.

(10) Patent No.: US 9,405,658 B1
(45) Date of Patent: Aug. 2, 2016

(54) METHOD AND APPARATUS FOR DEBUGGING APPLICATIONS IN DEVELOPMENT ENVIRONMENTS

(75) Inventors: Christopher B. Webster, Dublin, CA (US); Todd A. Fast, San Francisco, CA (US); Jiri Kopsa, San Francisco, CA (US); Girish Kumar Balachandran, Mountain View, CA (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 1559 days.

(21) Appl. No.: 12/127,503

(22) Filed: May 27, 2008

(51) Int. Cl.
*G06F 9/44* (2006.01)
*G06F 11/36* (2006.01)

(52) U.S. Cl.
CPC .................................. *G06F 11/362* (2013.01)

(58) Field of Classification Search
CPC ........................................................ G06F 11/362
USPC ............................................................. 717/129
See application file for complete search history.

(56) References Cited

U.S. PATENT DOCUMENTS

| | | | | |
|---|---|---|---|---|
| 5,819,093 A | * | 10/1998 | Davidson | G06F 11/3664 714/25 |
| 6,026,362 A | * | 2/2000 | Kim et al. | 705/317 |
| 2001/0004766 A1 | * | 6/2001 | Koyama | 717/4 |
| 2002/0019843 A1 | * | 2/2002 | Killian | G06F 9/465 718/102 |
| 2003/0046663 A1 | * | 3/2003 | Rogers et al. | 717/125 |
| 2003/0056198 A1 | * | 3/2003 | Al-Azzawe et al. | 717/127 |

OTHER PUBLICATIONS

Andrew Tolmach et al., "Debuggable Concurrency Extensions for Standard ML", ACM, 1991.*

* cited by examiner

*Primary Examiner* — Wei Zhen
*Assistant Examiner* — Lanny Ung
(74) *Attorney, Agent, or Firm* — Precision IP (57) ABSTRACT

A method for debugging applications in a development environment. The method may include terminating a thread when a breakpoint is encountered when debugging an application. The method may also include saving input and outputs from an external server invocation.

13 Claims, 6 Drawing Sheets

FIG. 1

Local   200

Server   250

METHOD AND APPARATUS FOR DEBUGGING APPLICATIONS IN DEVELOPMENT ENVIRONMENTS

FIELD OF THE INVENTION

The present invention generally relates to debugging applications and more specifically to debugging applications or services in development environments.

BACKGROUND

Generally, software applications, services, instructions and any type of program code may be developed and/or executed in a number of development environments. While an application is running, the application may fail, may produce unexpected results or the developer may simply wish to inspect different states of the application (either while the developer is working on the software code or has already completed the software code), thus a need to debug the application may arise. The application may be debugged in a number of ways such as manually parsing through each line of the code, testing the code for circumstances that produce errors, using debugging applications and so on.

Conventional debugging applications suspend an application at selected places in its programming in order to observe various execution states of the application. This type of debugging application may be useful in a number of computing environments, including computing environments that use threads to execute applications. It may also be appropriate to use different types of debugging applications in different types of computing environments. A debugging application may be the most appropriate debugging tool for one type of computing environment, but the debugging application may also function correctly in a number of different computing environments.

Debugging applications may function correctly in a hosted development environment, but may not be practical due to some of the general hosted development environment characteristics. For example, in a hosted development environment it is possible for a number of developers to simultaneously develop and/or debug their applications. However, a limited number of threads may be available in the hosted development environment and the number of developers wanting to debug their applications may outnumber the number of threads available. This circumstance may occur when a thread is invoked to execute an application and the thread is suspended during debugging. Further, the thread may be suspended during debugging when the application encounters a breakpoint in the software code. Even though the thread is suspended, the thread is not available for use by any other developers. Moreover, the thread may not be released back into the pool for use by other developers until the application completes execution or the developer completes debugging their application. Accordingly, the number of threads may effectively limit the ability of multiple developers to debug their applications at the same or substantially the same time. Although it is possible for developers to eventually access and debug their applications in the hosted development environment, it is desirable for developers to have the ability to debug and access their applications when needed.

Accordingly, there is a need in the art for an improved method of debugging applications. As will be recognized from the discussion below, these and other problems in the art are addressed by various systems and methods conforming to aspects of the present invention. Before explaining the disclosed embodiments in detail, it is to be understood that the invention is not limited in its application to the details of the particular arrangements shown, because the invention is capable of other embodiments. Moreover, aspects of the invention may be set forth in different combinations and arrangements to define inventions unique in their own right. Also, the terminology used herein is for the purpose of description and not of limitation.

SUMMARY

Generally, one aspect of the present invention involves a method of debugging an application. The method comprises invoking a first thread to execute an application that may include at least one breakpoint, terminating at least the first thread at the at least one breakpoint and recording at least a first state of the application upon termination of the first thread. The method also involves releasing the first thread at the at least one breakpoint and invoking a second thread to execute the application using at least the recorded first state of the application.

Another aspect of the present invention involves invoking an external service during invocation of the application and receiving information from the external service. Additionally, the information may be recorded from the external service and the information from the external service may be sent to a client. A third thread may be used to execute the application using at least one of the information recorded from at least the first state of the application upon termination of the first thread and the information from the external client.

Still another aspect involves a method for debugging an application in a hosted development environment. The method may comprise sending an input from a client to a server including a service, executing the service using a thread, terminating the service at an at least one breakpoint and storing information generated by the service. Further, the input may comprise a request that a simulation mode be used. The thread may be terminated at the at least one breakpoint. The method may include invoking an external service during execution of the service. Additionally, the information from the external service may be returned from the external service to the executing service. The information from the external service may be received by the executing service, may be recorded and may be sent to the client. The service may be invoked using another thread, wherein invoking the service further comprises executing the service using at least the recorded information from the external service. Furthermore, the input from the client may request a termination at a first breakpoint after arriving at a second breakpoint.

Still another aspect of the present invention involves a system for debugging a service in a development environment. The system may include a first computing device configured to send an input to a second computing device. The second computing device may include a service that may be executed using a thread for the purpose of debugging and the thread may be terminated prior to completion of the service execution. The system may also include a data storage device operative to store information generated by the service during operation of the thread, wherein the stored information is used to resume debugging of the service. Additionally, the thread may be terminated at an at least one breakpoint positioned within a code sequence of the service, wherein the stored information comprises a state of the service at the at least one breakpoint.

It should be noted that embodiments of the present invention may be used in a variety of development environments or systems including local systems, servers, hosted development environments and so on. The embodiment may include a variety of computing systems, servers and environments. Aspects of the present invention may be used with practically any method or apparatus related to computing systems and development environments that may contain any type of software code. Accordingly, embodiments of the present invention may be employed in local systems, servers, networks, interactive development environments, hosted development environments including peripheral systems and applications and so on.

These and other advantages and features of the present invention will become apparent to those of ordinary skill in the art upon reading this disclosure in its entirety.

DETAILED DESCRIPTION OF EMBODIMENTS

Generally, one aspect of the present invention may include a method of debugging applications in a hosted development environment. The hosted development in this embodiment may include a server which may have one or multiple services. The services may be invoked by a client and may be executed using a thread. During execution of the service, a breakpoint may be encountered and the thread may be terminated and the service may also be terminated. At the breakpoint, information and/or results may be stored and the information and/or results may be returned to a client. The information and/or results may also be stored during execution of the service. Upon another invocation of the service, the stored information and/or results may be used for executing the service.

Another aspect of the present invention may include recording information from a service invocation. A client may invoke a service via a server and the server may execute the service in a simulation mode. While the service is executing, the service may invoke an external service. The external service may return information to the service and the information may also be stored and/or returned to the client. The information may include input and output information for the external service invocation, as well as breakpoint variables. Additionally, the stored information may be used if the service is invoked again. For example, the service may not have to invoke the external service and may instead use the stored information to continue execution.

It should be noted that embodiments of the present invention may be used in a variety of development environments or systems including local systems, servers, hosted development environments and so on. The embodiment may include a variety of computing systems, servers and environments. Aspects of the present invention may be used with practically any method or apparatus related to computing systems and development environments that may contain any type of software code. Accordingly, embodiments of the present invention may be employed in local systems, servers, networks, interactive development environments, hosted development environments including peripheral systems and applications and so on.

Figure 1:
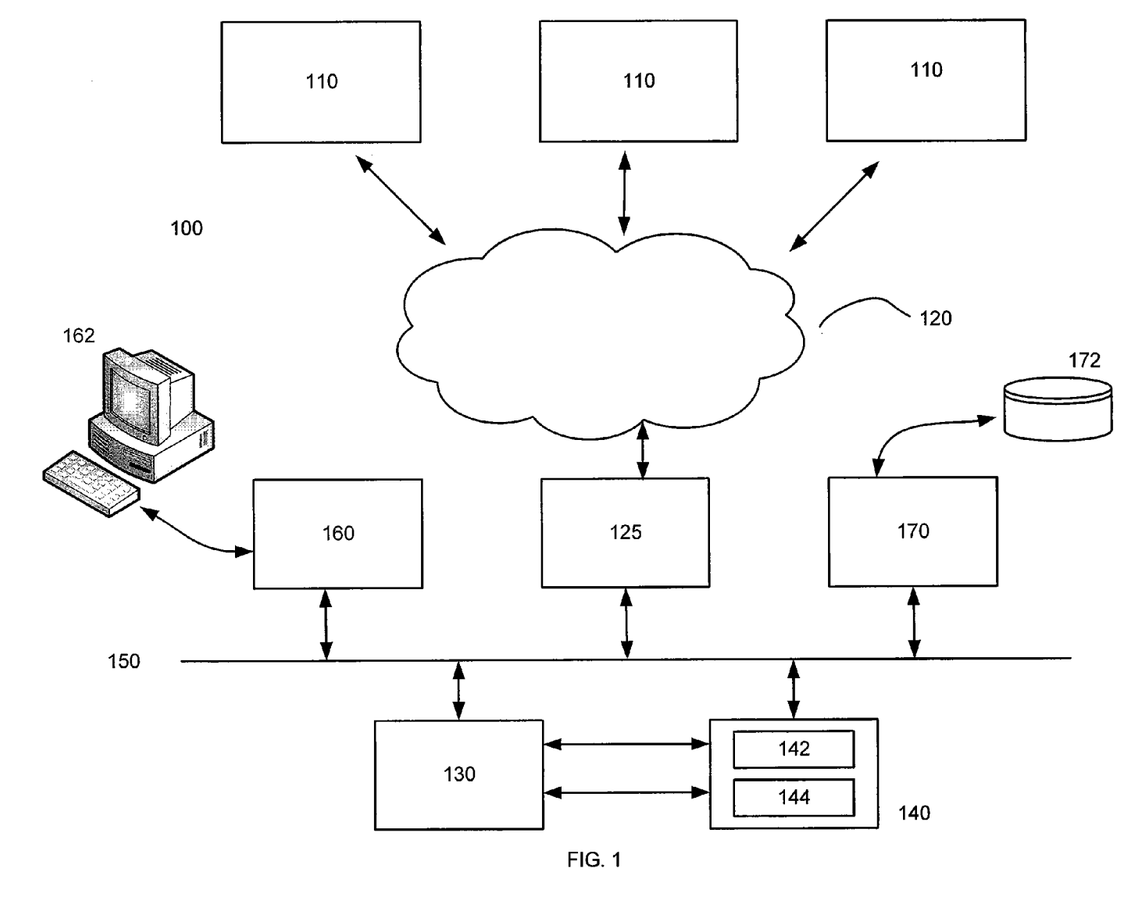
FIG. 1 depicts one representation of a computing environment that includes a hosted development environment.

FIG. 1 is a representation of a computing environment 100, such as a hosted development environment, that may be configured to conform with various aspects of the present invention. Generally speaking, the term "hosted development environment" may refer to a hosted environment where developers may develop applications. The hosted environment may include the necessary facilities for a developer to build applications, such facilities including servers, source code editors, compilers, debuggers and so on and additionally as discussed in Appendix A The computing environment 100 may include multiple client systems 110 connected to the hosted development environment through the Internet 120. Further, the hosted development environment itself may be an application and/or service and may serve clients. The clients may interact directly with the user interface provided by the hosted development environment or may interact through the services of the hosted development environment.

In other embodiments, it is possible that the client systems 110 may connect to the hosted development environment by other methods, such as through proprietary, local or wide area network. Additionally, other development environments may be used, such as integrated development environments, distributed development environments, network environments and so on. Hence, the hosted development environment is discussed herein for explanatory purposes and not of limitation. The client systems 110 may also connect to at least one server 130 and to a central processing unit 140 ("CPU") via the internet 120 and the internet interface 125. The CPU 140 may include an operating system 142 and a main memory 144. There may be one CPU or multiple CPUs in the basic computing environment 100. It is also possible for the server 130 and the CPU 140 to be one system or separate systems in the basic computing environment 100.

In one example, various devices in the hosted development environment may also communicate with each other through a communication bus 150. Although only one communication bus is included in the basic computing environment 100, this is done for explanatory purposes and not to place limitations on the system. Generally, multiple communication buses may be included in any computing environment including a hosted development environment. As shown in FIG. 1, the server 130 and the CPU 140 may communicate directly with one another or through the communication bus 150. A user input interface 160 and a data storage interface 170 may also be connected to the communication bus 150. The user input interface 160 may allow a user to input information and/or to receive information through one or multiple input devices such as input device 162, within the hosted development environment or to the client systems 110. The user inputs may include various elements such as a keyboard, a touchpad, a mouse, any type of monitor including CRT monitors and LCD displays, speakers, a microphone and so on. The data storage interface 170 may include data storage devices such as data storage device 172.

Figure 2:
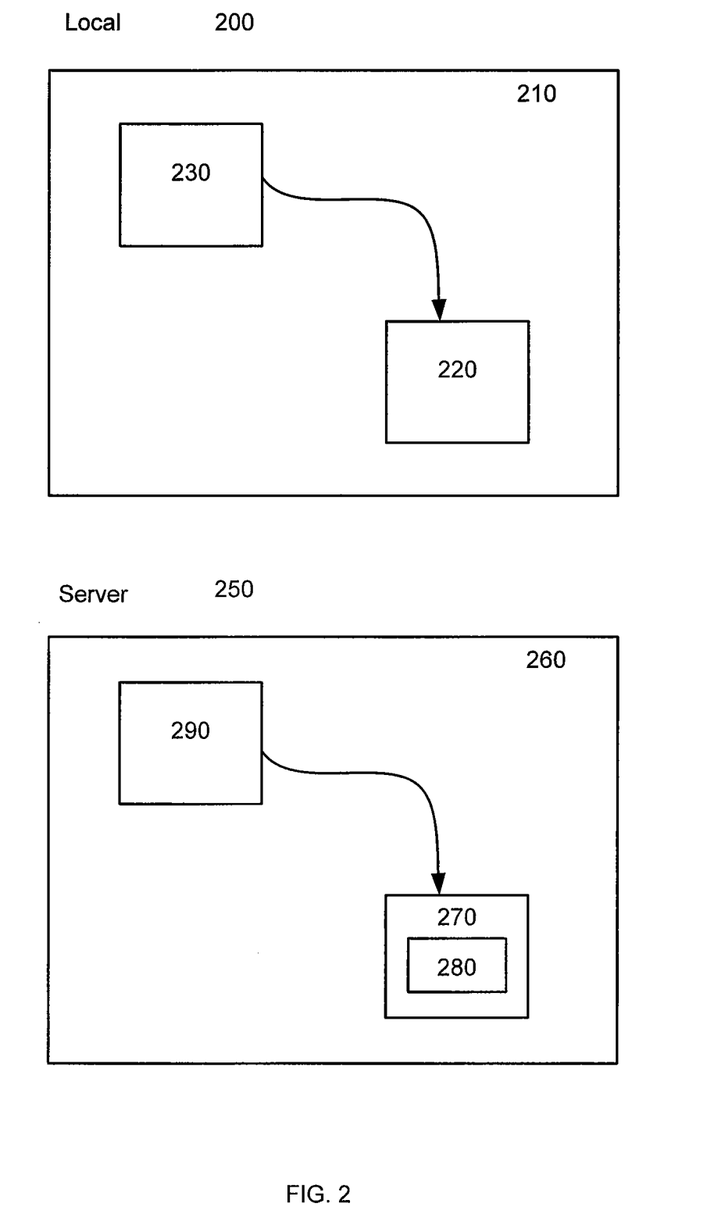
FIG. 2 depicts a representation of different computing environments in which applications may be debugged.

FIG. 2 is a representation of different computing environments in which applications may be debugged. Generally speaking, applications may execute and be debugged in local as well as network computing environments. FIG. 2 includes a local computing environment 200. The local computing environment 200 may include a system 210 that may include various elements such as a central processing unit, memory and so on. The system 210 of the local computing environment 200 may be a stand alone system and may not be part of a network intranet, but the system 210 may access the Internet. For example, the system 210 may be a local desktop computing system 210 which may be configured to run various applications including an application 220. A user may execute the application 220 and the application 220 may fail or produce unexpected results, thus a user may wish to debug the application 220 on the local desktop computing system 210. To debug the application, the user may employ a debugging application 230. (The user may wish to debug the application in a number of circumstances, including when the application is producing expected results.) In one example, the debugging application 230 may "attach" to or monitor the running application 220. Hence, the debugging application 230 may control the application 220 and may cause application 220 to execute.

While the application 220 is running, a number of instructions may execute and values may be assigned to variables. The debugging application 230 may be configured to inspect the application 220 at various points during execution. The points at which the executing application 220 may be inspected may be referred to herein as "breakpoints." The software code for the application 220 may include a single breakpoint or multiple breakpoints and the debugging application may provide a mechanism to set the breakpoint or the breakpoint may be placed directly in the software code. Multiple breakpoints may also be placed in different locations throughout the software code of the application 220. If the application 220 has multiple breakpoints, the debugging application 230 may effectively "step through" the application 220, providing the person debugging the application with various information as each line of software code of the application executes. When the application 220 encounters a breakpoint, the user may have an opportunity to inspect and/or analyze various aspects of the application 220 such as the different variable values produced by the application 220.

FIG. 2 also includes a network computing environment 250. The network computing environment 250 may include one or more servers or systems such as system 260. The system 260 may include a server 270 configured to run at least one application 280. The server 270 may further include a debugging application 290 suitable to debug the application 280. The server 270 may be an application server 270 or any other type of container such as a web server that may run the application 280. Additionally, the application 280 may be any type of application including a web application such as a web browser. Similar to the local computing environment 200, a user may debug the application 280 in the network computing environment 250 using the debugging application 290. However, in the network computing environment 250, the server 270 may create new threads to execute different applications or the same application multiple times. The server 270 may also include one application or multiple applications which may execute individually, sequentially and/or simultaneously.

Figure 2A:
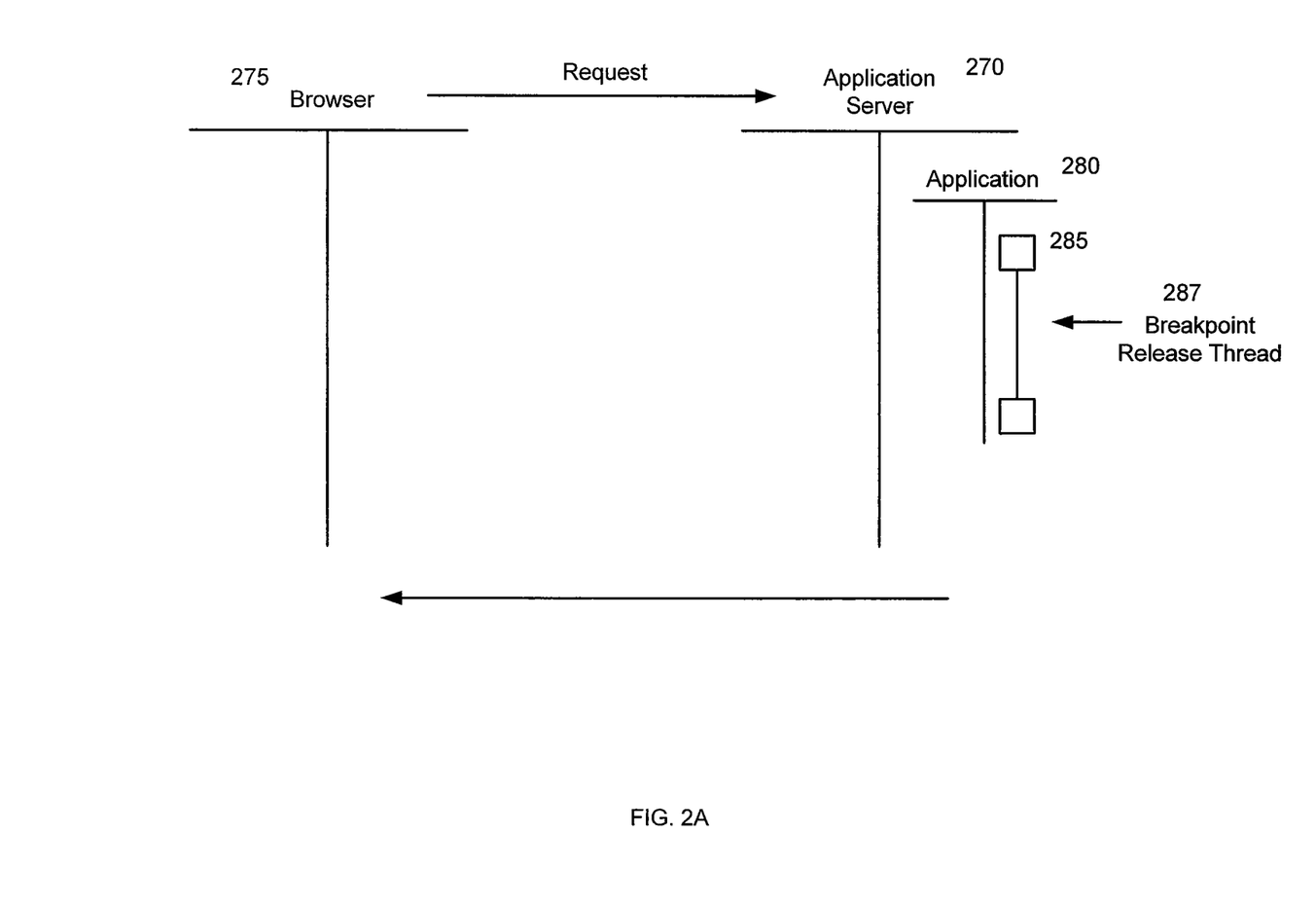
FIG. 2A depicts a representation of one possible flow of debugging an application in a server environment.

For example, a user may execute debugging application 290 and the debugging application 290 may cause the application 280 to execute. (When debugging, it is also possible for the user to run the application 280 and run the debugging application 290 and the debugging application 290 may attach to or monitor the running application 280.) As shown in FIG. 2A, a browser 275 may make a request to the server 270, in this example, an application server 270. The application 280 may run on any platform or operating system such as Java™ or Windows™ and so on. The application 280 may be a program that includes instructions. The application server 270 may create a new thread 285 to execute the application 280 and the thread 285 may be a way to execute the application 280. It is also possible for one thread to be running or multiple threads to be running simultaneously on the application server 270. In this example, a single thread may be allocated to each request to the application server 270 and multiple overlapping, concurrent, or serial requests may be made to the application server 270. Thus, it may be the case that the number of requests made by the browser 275 to the application 280 may be limited by the number threads that may be run from the application server 270.

In FIG. 2, as the application 280 executes on the application server 270, the application 280 may encounter a breakpoint 287 and the application may terminate execution. Further, when the application 280 is terminated, the thread 285 may also be terminated and released, while the information from the application and/or the state of the application may be stored and made available to the user. The user may then inspect the information and/or the state of the application 280. Once the user has completed their inspection of the application 280, the user may invoke the application 280 again. It is possible for a single breakpoint to be included in the software code of the application 280 or for multiple breakpoints to be included in the software code of the application 280. The application 280 may terminate execution at each encountered breakpoint and the thread 285 may be terminated and released as well. As in the local computing environment 200, it may be possible to step through the application 280 in the network computing environment 250 and inspect various states of the application including variable values at each breakpoint. Once the application 280 completes running, the thread may be released and a response may be returned to the browser 275.

Figure 3:
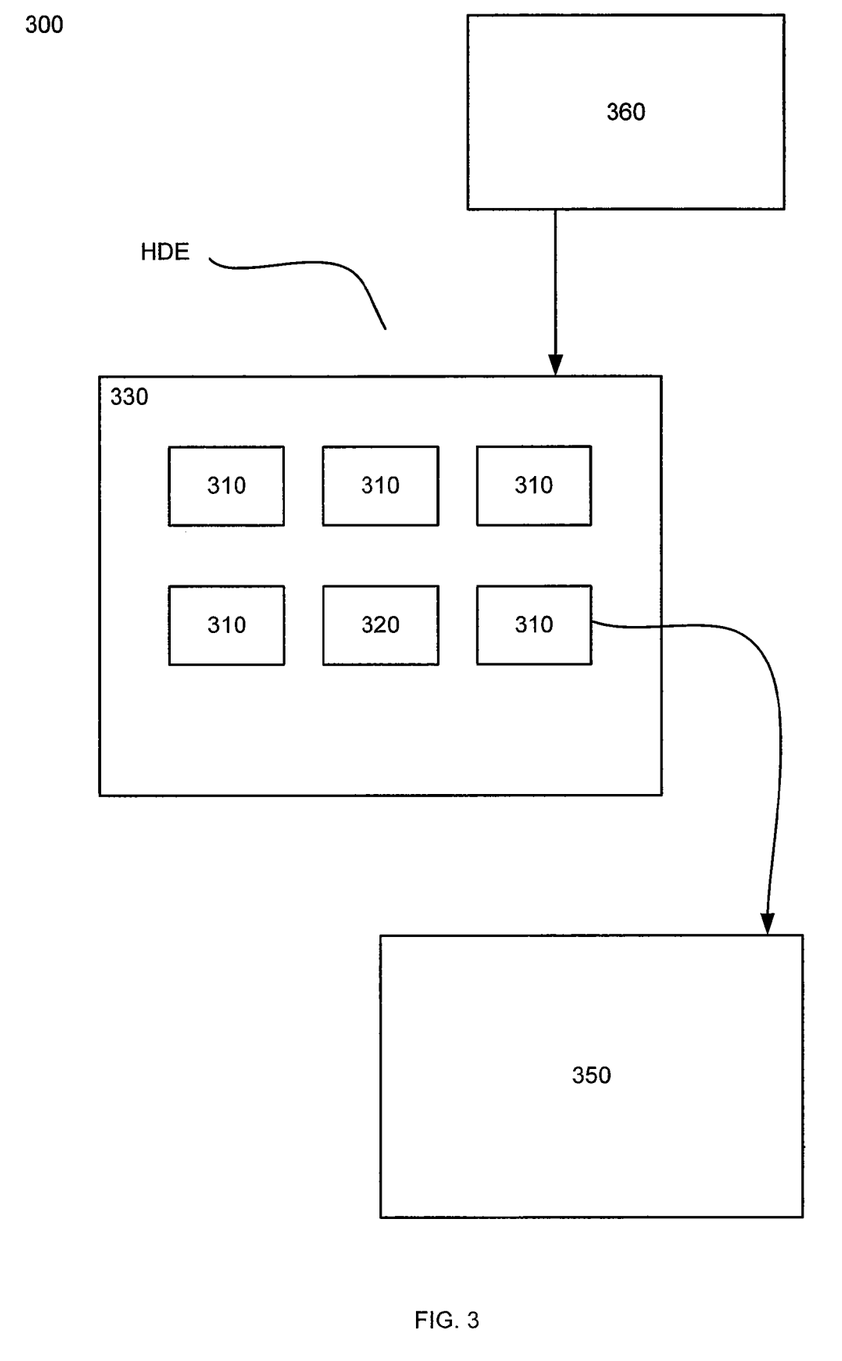
FIG. 3 depicts a representation of a hosted development environment where an application may be debugged.

FIG. 3 is one embodiment of a hosted development environment 300 where an application may be debugged. The hosted development environment 300 may include one or more applications, services, code, executable code and so on. The term "service" may be used herein interchangeably with the term "application" for explanatory purposes and not of limitation. The applications or services may run on a server, or on a machine such as a CPU and so on. Additionally, the applications or services may include any type of code, executable code or any set or sets of instructions. Generally, a hosted development environment may include one server or multiple servers, or may include one machine such as a CPU or multiple machines and so on. In FIG. 3, the hosted development environment 300 includes multiple services 310 and a debugging application 320. The multiple services 310 may be on a server 330. The service 310 of hosted development environment 300 may access a remote server 350 for any reason, including to access information. As previously discussed with respect to the local computing environment 100 and the network computing environment 200, the service 310 may be debugged using the debugging application 320. Furthermore, the service 310 may run and the debugging application 320 may run and attach to the executing service 310. It is also possible for a network computing environment 200 to include a hosted development environment 300.

Figure 3A:
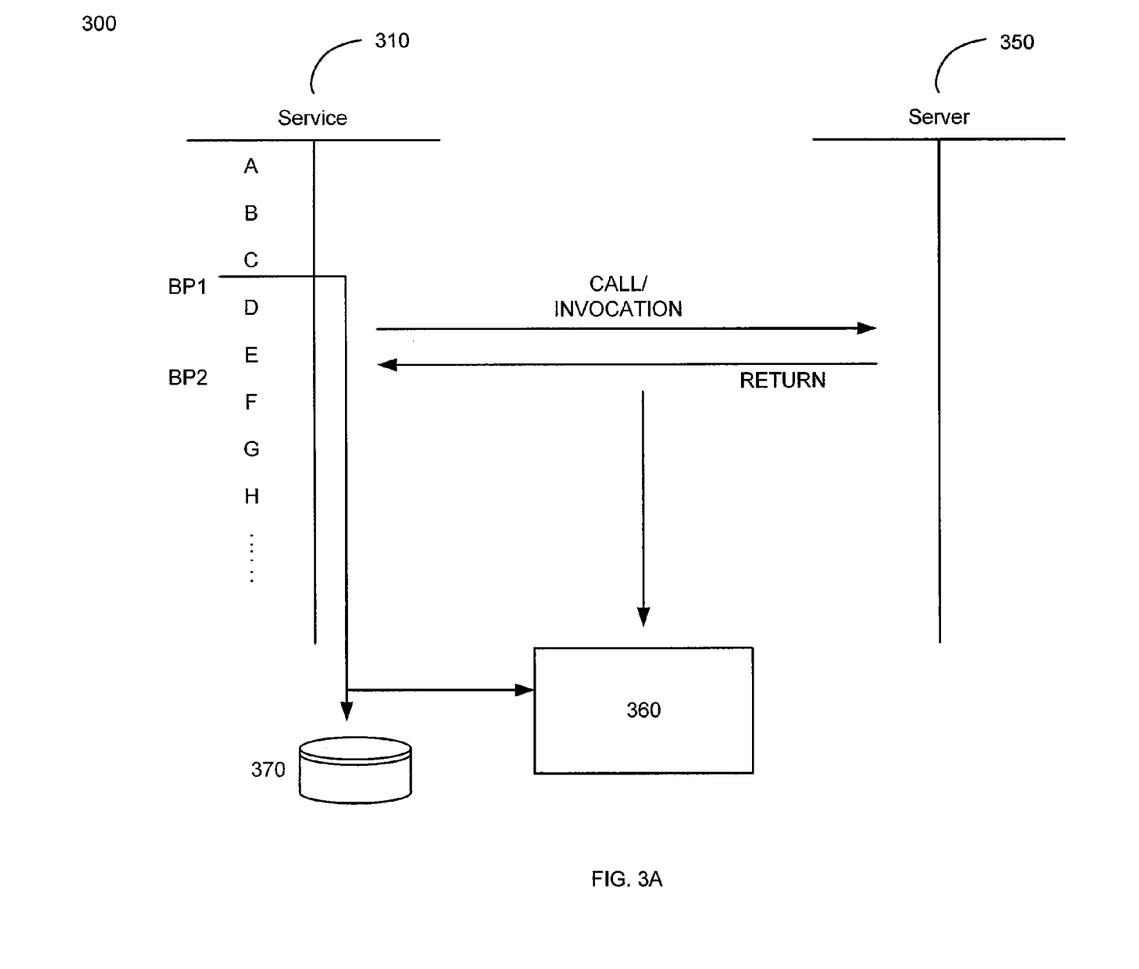
FIG. 3A depicts another representation of another possible flow of debugging a service in a hosted development environment.

Similar to the network computing environment 200, one or multiple threads may be used to execute one or more services 310. However, in the hosted development environment 300, multiple users may be developing and/or debugging applications simultaneously. Accordingly, in the hosted development environment, there may be a limited number of threads which may limit the number of users that may substantially simultaneously develop and/or debug the applications in the hosted development environment. For example, as depicted in FIG. 3, a service, such as service 310 may be executing and the debugging application 320 may also be running. The service 310 may be running on a thread where a thread may be a means of executing the service 310. As shown in FIG. 3A, the service 310 may call the server 350. FIG. 3A generally depicts one possible flow of an executing service calling a server. FIG. 3A includes the general flow of information from the service and information from the server. There may be any number of reasons a service may call a server including to access data or to share data with the server. Generally, the server 350 may be an external server, a remote server, a server connected to the system hosting the server through a local network, a direct connection, or by way of the Internet or other wide area network. Further, the service 310 may call another service in the hosted development environment and so on. While the service 310 executes, variables such as variables A, B, C, D, E, F and so on may be scoped and/or assigned values and so on.

In FIG. 3A, a breakpoint BP1 may be encountered while the service 310 is executing. At the breakpoint BP1, the service 310 may stop executing and the thread may be terminated (the execution path may be terminated) and the thread may be released into the pool for another use. Further, when the breakpoint BP1 is encountered, the state of the variables of the application may be recorded in memory 370 and also may be sent to a client 360. In one embodiment, the state of the input variables and the breakpoint variables may be captured or recorded/transmitted at the breakpoint BP1.

In one example, the service 310 may encounter breakpoint BP1 and at breakpoint BP1, the state of variables A, B, and C, may be recorded. A user may have the opportunity to inspect and/or analyze the variables at the breakpoint BP1. Similar to the network computing environment 200, the user may inspect and/or analyze the variables at each breakpoint. However, in the hosted development environment at the breakpoint, the application may not be suspended and the thread may not be suspended. Instead, at the breakpoint in the service in the hosted development environment, the service may no longer be executing and the thread may have terminated the execution path and the thread may be released. Because the thread may be released, the thread may become available in the pool as a means of executing another service or application. The availability of the thread in the pool allows other users to invoke the thread to debug and/or develop their applications, thus mitigating the limiting effect of the number of threads available in the hosted development environment. In another embodiment, threads may be suspended and/or terminated and released when a breakpoint is encountered.

In another example, a user may execute the service 310 and may also execute the debugging application. Initial execution of the service 310 may occur when a client 360 sends an input message to the server 330 to execute including a request that a simulation mode be used when executing the service 310. The simulation mode may allow the service 310 to use stored information when executing. The use of stored information by an executing service will be discussed in more detail below. The server 330 may then execute the service 310 by means of a thread. Additionally, the service 310 may be executing in a hosted development environment 300. The breakpoint BP1 may terminate the execution of the service 310 and may terminate the thread (the execution path may be terminated). At the breakpoint BP1, information such as the state of the variables A, B and C may be recorded and may be returned to the client 360. Generally, the information recorded at a breakpoint may include the state of the variables, identification information for the breakpoint, a list of external invocations and scoped variables. The external invocations may be a call to a function, which may result in the invocation of code that may be remotely located. Additionally, scoped variables may be any variable which may be available to the executing code at the current breakpoint. It is also possible for this method to be employed in any number of computing environments including hosted development environments, integrated, development environments, distributed development environments, network environments and so on. Furthermore, the information may be recorded while the service 310 is executing. At the breakpoint BP1, the client 360 device may display the results to the user.

The user may be able to inspect and/or analyze the state of at least variables A, B and C. The user may then wish to invoke the service 310 again, but debug the service to a point beyond breakpoint BP1. Accordingly, the service 310 may execute again on another thread and instead of running the service 310 again and assigning values to variables A, B and C again, the recorded data for variables A, B and C may be used from the previous execution of the service 310. It may not be apparent to the user that the service 310 was terminated at the breakpoint BP1 instead of suspended at the breakpoint BP1. Stated differently, the function of the debugging application may appear, to the user, similar to a debugging application that suspends the execution of the application at a breakpoint, (which was described with respect to the network computing environment 200), even though the application terminates execution. Generally, it is also possible for the user to execute the service again and may use the initial input to reach the next breakpoint.

Continuing the example, service 310 may execute again (beyond breakpoint BP1) and may assign values to variables D and E. The service 310 may make an external call or invocation and invoke or call a server 350. The external call to the server 350 may be a call to a remote server, a network server in the same network as the executing service 310 and so on. In the example of FIG. 3A, the service 310 invokes the remote server 350. When the service 310 invokes an external service or calls the remote server 350, the remote server 350 may return information such as output variables and/or return values. The remote server 350 may return a value that may be stored in a programming variable. Hence, the return value may be stored and reused to provide idempotent external invocations. Moreover, the hosted development environment may make the determination to use the simulated values before invoking the external service or calling the remote server 350. Next, the service execution environment may inspect the incoming information returned from the remote server 350 to make the determination whether and/or how the execution results should be simulated. This may include listing the external results, listing how to handle the external results and so on. The service execution environment may also inspect information generated by the executing application, such as the state of variables modified by the application, to make the determination of how the execution results should be simulated. For example, after inspecting the information, the service execution environment may determine that information from an external invocation may need to be simulated or the determination may be made that values of variables may be used when executing the service.

After invocation of the remote server 350, the service 310 may continue executing until it hits the next breakpoint, in this example, breakpoint BP2. At breakpoint BP2 the service 310 may again stop executing and the thread may be terminated and released. At breakpoint BP2, the state of the service 310 may be recorded and the recorded information may also be sent to the client. In one embodiment, the recorded state at breakpoint BP2 may include input values and breakpoint values. Further, the information being recorded may also include the return values from the external call to the remote server 350. Generally, by caching the results from the invocation, idempotent external service invocation may be provided.

Continuing the example, after the thread was terminated and released at breakpoint BP2, the user may again wish to continue debugging the service 310, thus the service 310 may execute again via another thread. While executing, the service 310 may use previously recorded information such as the information recorded at breakpoint BP1 and breakpoint BP2. This may continue until the user does not continue debugging, the service 310 has no remaining breakpoints or the service 310 may not be executed again based on a number of other reasons. Although the discussion of FIGS. 3 and 3A focused on debugging a service in a hosted development environment, the discussion was for explanatory purposes and not of limitation. It is also possible for the debugging method to be applied in any number of various development environments such as hosted development environments, integrated development environments, distributed development environments, network environments and so on.

In a further embodiment, in executing the service 310, the client 360 may send an input message to the server 330 to execute and may include a request to terminate at breakpoint BP1 even though the previous execution of the service 310 may have terminated at breakpoint BP2. This embodiment may allow the user to re-evaluate the information at breakpoint BP1. For example, the user may inspect the information at breakpoint BP2 and identify some unexpected values. The user may wish to return to the information at breakpoint BP1 to inspect the information again to insure the accuracy of the data. Accordingly, the simulation mode may allow the service 310 to use stored information when executing as it steps through the code forward. Moreover, the simulation mode may allow the stored information from a previous breakpoint to be inspected even after bypassing the breakpoint. By providing the ability to inspect information from a previous breakpoint, the user may effectively inspect the state of the code from a previous invocation (the state of the code in the past) or step backwards through the code.

Figure 4:
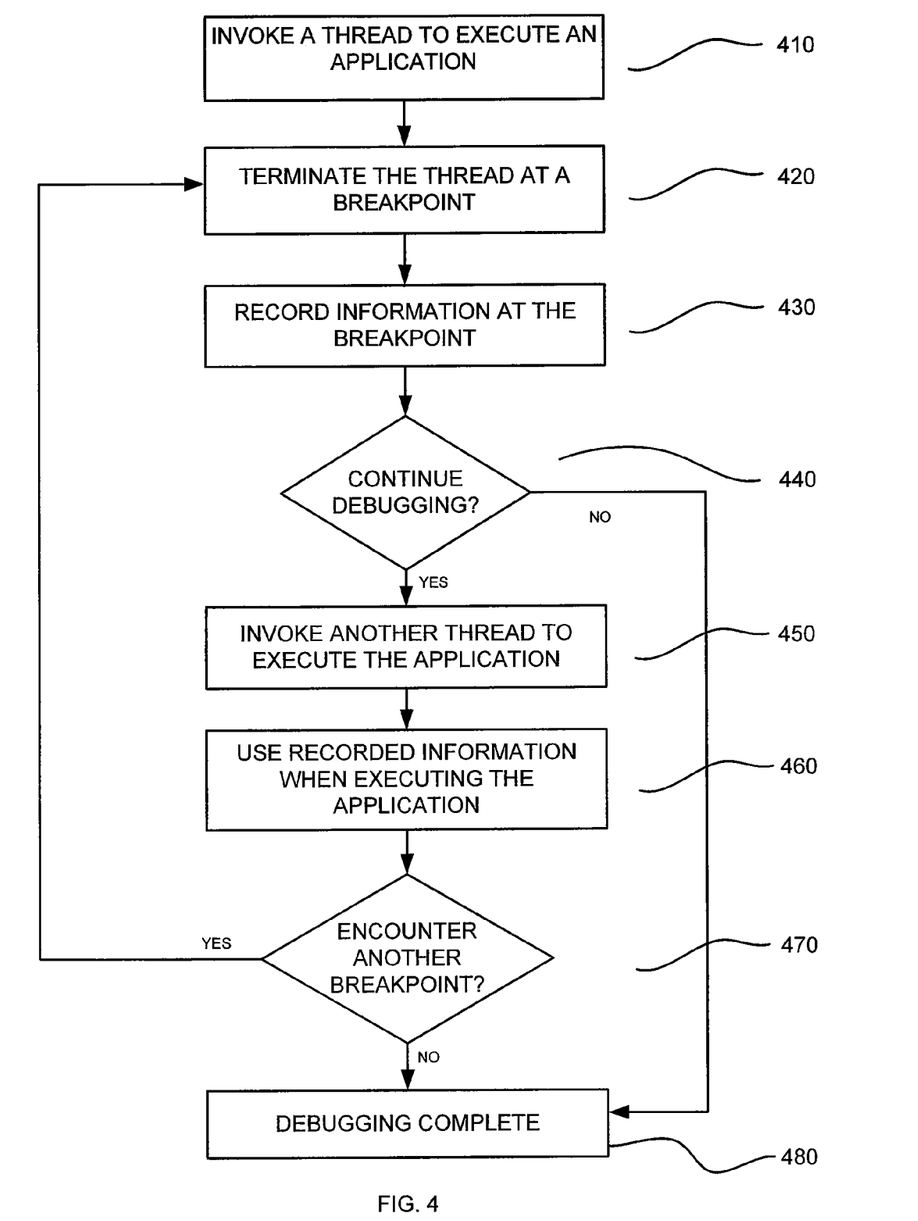
FIG. 4 depicts an embodiment of a flow chart.

FIG. 4 depicts a method flow chart 400 of one aspect of the present invention. The flow chart 400 begins with the operation of block 410, invoking a thread to execute an application. For example, a client may send a request to a server and the server may execute an application or a service. The client may communicate the information that a simulation mode should be used when the server executes the application or service. In one embodiment, as previously discussed with respect to FIGS. 3 and 3A, in one embodiment, the service may be executing on a server in a hosted development environment.

In the operation of block 420, the thread may be terminated at a breakpoint in the service. The executing service may have one breakpoint, multiple breakpoints or no breakpoints in the software code. In the case the service has no breakpoints, the thread and the service may terminate when the service completes execution. In one example, the service may encounter a first breakpoint. At the first breakpoint, the thread and the service may terminate. When the thread terminates at the first breakpoint, the thread may be released and returned to the pool of threads and may be used again for executing the same service or a different service.

Next, in the operation of block 430, information may be recorded at the first breakpoint. The recorded information may be execution results and may include the state of variables, identification information for the breakpoint, a list of external invocations and scoped variables. The operation of block 420 and block 430 may occur in either order. The particular order of terminating the thread at the breakpoint first and then recording a state at the breakpoint second is discussed herein for explanatory purposes only and not of limitation. Generally, the information such as state may be recorded while the service is executing or may be recorded at the breakpoint or after the breakpoint is hit. Also, in the operation of block 430, the determination may be made whether the execution results should be simulated. The service execution environment may make this determination and may inspect the incoming information or may inspect information such as whether the handling of the results is specified or how the results should be handled is specified and so on.

Continuing the above example, the recorded information may be returned to the client and the client may display the information to the user. The user may inspect information such as the state of variables. The user may then make the determination whether to continue debugging the service as depicted in the operation of block 440. If the user does not continue debugging and does not invoke the service, the debugging may be complete as shown in the operation of block 480. If the user continues debugging the service, another thread may be invoked to execute the service again as shown in the operation of block 450. A different thread or the same thread may be invoked to execute the service again as shown in the operation of block 450.

In the operation of block 460, the information recorded at the first breakpoint may be used in the execution of the service. While executing, the service may make an external invocation or make a call to a server. As previously discussed, the external invocation may be to a remote server or may be made to a server in the same hosted development environment, or may be made to another service in the hosted development environment and so on. Continuing this example, the service invokes an external service and the external service returns external results to the service. As the service continues to execute, a second breakpoint may be encountered. If a second breakpoint does not exist then the debugging may be complete and the service may terminate execution as depicted in the operation of block 480. In the case where the execution hits another breakpoint, then the thread may again be terminated at the second breakpoint as depicted in the operation of block 420.

Similar to the previous discussion of the operation of block 430, the information may be recorded at the second breakpoint and may be sent to the client. The information sent back to the client may include a list of external invocations, the state or states of variables, breakpoint identification information and scoped variables. The client may display the information to the user and the user may inspect the information for any number of purposes including to debug the service. When the user finishes inspecting the information, the user may be finished debugging or no longer continue debugging or the user may need to continue debugging. In the case where the user does not wish to continue debugging for any reason, the debugging may be complete and the service may not be invoked again as depicted in the operation of block 480. If the user invokes the service again, then the flow continues to the operation of block 450 and may continue to follow the discussion above.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

The invention claimed is:

1. A non-transitory computer readable medium comprising instructions which, when executed by one or more hardware processors, causes performance of operations for debugging an application comprising:
   invoking by one or more computing devices, a first thread to execute an application currently being debugged by a debugger, the application including at least one breakpoint;
   invoking an external service during execution of the application being debugged by the debugger, the external service including functions remotely located from the application and the debugger, wherein at least one function of the functions returns output to at least one variable of the application;
   terminating, using at least one processor, the first thread at the at least one breakpoint;
   releasing the first thread to a pool of threads at the at least one breakpoint;
   recording information comprising a state of the at least one variable, external invocation information corresponding to the invocation of the external service, and an identification of at least one scoped variable upon termination of the first thread; and
   based on the state of the at least one variable, invoking a second thread of the pool of threads to re-execute the application, wherein any new external services encountered during the re-execution of the application are ignored and wherein the re-execution proceeds using the external invocation information.

2. The medium of claim 1 further comprising determining whether execution results of the application should be simulated based on the recorded information.

3. The medium of claim 1 wherein the external service is a remote server.

4. The medium of claim 1 further comprising sending the external invocation information to a client.

5. The medium of claim 1 further comprising invoking a third thread to execute the application using the recorded information upon termination of the first thread.

6. The medium of claim 1 further comprising requesting a termination at the first breakpoint after arriving at a second breakpoint.

7. The medium of claim 1, wherein invoking the external service comprises invoking code that is located remotely from the application and wherein the external invocation information comprises at least one of input information corresponding to the external service and output information corresponding to the external service.

8. A non-transitory computer readable medium comprising instructions which, when executed by one or more hardware processors, causes performance of operations for debugging a service in a hosted development environment comprising:
   receiving input from a client;
   sending the input from a client to a server including a service currently being debugged by a debugger;
   executing the service using a thread;
   invoking an external service during execution of the service being debugged by the debugger, the external service including functions remotely located from the service and the debugger, wherein at least one function of the functions returns output to at least one variable of the service;
   terminating the service at, at least one breakpoint;
   releasing the first thread to a pool of threads at the at least one breakpoint;
   storing information generated by the service, the information comprising at least a first state of the at least one variable, external invocation information corresponding to the invocation of the external service, and an identification of at least one scoped variable; and
   based on the state of the at least one variable, invoking a second thread of the pool of threads to re-execute the application, wherein any new external services encountered during the re-execution of the application are ignored, and wherein the re-execution proceeds using the external invocation information.

9. The medium of claim 8 wherein the input further comprises a request that a simulation mode be used.

10. The medium of claim 8 further comprising sending the external invocation information to the client.

11. The medium of claim 8 the operations further comprising requesting termination of the service at the at least one breakpoint.

12. A system for debugging a service in a development environment comprising:
   a first computing device configured to send input to a second computing device;
   the second computing device including a service configured to execute using a first thread for the purpose of debugging the service using a debugger, wherein an external service is invoked during the execution of the service being debugged by the debugger, the external service including functions remotely located from the service and the debugger, wherein at least one function of the functions returns output to at least one variable of the service and wherein the first thread is terminated prior to completion of the service execution and wherein the first thread is released to a pool of threads at at least one breakpoint; and
   a data storage device operative to store information generated by the service during operation of the thread, the information comprising at least a first state of the at least one variable, external invocation information corresponding to the invocation of the external service, and an identification of at least one scoped variable, and wherein the stored information is used to resume debugging of the service; and
   at least one device in the system, based on the state of the at least one variable, invoking a second thread of the pool of threads to re-execute the application, wherein any new external services encountered during the re-execution of the application are ignored and wherein the re-execution proceeds using the external invocation information.

13. The system of claim 12 wherein the thread is terminated at the at least one breakpoint.

* * * * *